United States Patent
Kim et al.

(10) Patent No.: US 12,428,343 B2
(45) Date of Patent: Sep. 30, 2025

(54) AQUEOUS CARBONATION CURING METHOD OF BINDER COMPOSITION USING CARBON DIOXIDE ABSORBENT

(71) Applicant: KOREA ADVANCED INSTITUTE OF SCIENCE AND TECHNOLOGY, Daejeon (KR)

(72) Inventors: Jae Hong Kim, Daejeon (KR); Seong Ho Han, Daejeon (KR); Yubin Jun, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 564 days.

(21) Appl. No.: 17/739,346

(22) Filed: May 9, 2022

(65) Prior Publication Data

US 2022/0356116 A1   Nov. 10, 2022

(30) Foreign Application Priority Data

May 10, 2021   (KR) .................. 10-2021-0060310
May 10, 2021   (KR) .................. 10-2021-0060311

(51) Int. Cl.
  *C04B 28/04*   (2006.01)
  *C04B 28/02*   (2006.01)
  C04B 103/00   (2006.01)
  C04B 111/00   (2006.01)

(52) U.S. Cl.
  CPC ............ *C04B 28/04* (2013.01); *C04B 28/021* (2013.01); *C04B 2103/0078* (2013.01); *C04B 2111/00017* (2013.01)

(58) Field of Classification Search
  CPC .............. C04B 28/04; C04B 28/021; C04B 2103/0078; C04B 2111/00017; C04B 20/107; C04B 28/10; Y02W 30/91
  See application file for complete search history.

(56) References Cited

U.S. PATENT DOCUMENTS

2020/0361820 A1* 11/2020 Moradi Khou ....... C04B 22/064

FOREIGN PATENT DOCUMENTS

| CN | 111499295 B | * | 4/2021 | ............. C04B 20/06 |
| JP | S64-45788 | | 2/1989 | |
| JP | H05-70195 | | 3/1993 | |
| JP | 2015-024947 | | 2/2015 | |

(Continued)

OTHER PUBLICATIONS

Zhan et al. Mechanism for rapid hardening of cement pastes under coupled CO2-water curing regime, Cement and Concrete Composites, 97, pp. 78-88. (Year: 2019).*

(Continued)

*Primary Examiner* — Amber R Orlando
*Assistant Examiner* — Anastasia A. Kuvayskaya
(74) *Attorney, Agent, or Firm* — LEX IP MEISTER, PLLC

(57) ABSTRACT

An aqueous carbonation curing method of a binder composition according to an exemplary embodiment of the present invention includes: forming a binder composition; curing the binder composition in a negative pressure state (pre-curing step); water curing the pre-cured binder composition in an aqueous carbon dioxide absorbent solution (first curing step); and curing the first-cured binder composition in a 95% or more relative humidity atmosphere (second curing step).

14 Claims, 6 Drawing Sheets

(56) References Cited

FOREIGN PATENT DOCUMENTS

| | | | |
|---|---|---|---|
| JP | 2015-054806 | 3/2015 | |
| KR | 10-2004-0085227 | 10/2004 | |
| KR | 100526036 B1 * | 11/2005 | ........... C04B 18/061 |
| KR | 2013-0023961 | 3/2013 | |
| KR | 10-2013-0134045 | 12/2013 | |
| KR | 10-2014-0059884 | 5/2014 | |
| KR | 10-1619320 | 5/2016 | |
| KR | 10-1635833 | 7/2016 | |
| NO | 149707 B * | 2/1984 | ......... C04B 40/0231 |
| WO | WO-2020102724 A1 * | 5/2020 | ........... C04B 22/062 |

OTHER PUBLICATIONS

Maheswari et al. Carbon dioxide capture and utilization by alkanolamines in deep euteric solvent medium, Industrial and Engineering Chemistry Research, vol. 54, pp. 11383-11392. (Year: 2015).*

CN111499295-B Machine Translation (Year: 2021).*

NO149707-B Machine Translation (Year: 1984).*

KR100526036-B1 Machine Translation (Year: 2005).*

Caijun Shi et al., "CO2 Curing of Concrete Blocks", Concrete international 31.2(2009):39-43.

Yubin Jun et al., "Effects of CO2 Curing on Alkali-Activated Slag Paste Cured in Different Curing Conditions", Materials 12.21(2019):3513, Oct. 26, 2019, doi:10.3390/ma12213513.

Seong Ho Han et al., "CO2 Curing Efficiency for Cement Paste and Mortars Produced by a Low Water-to-Cement Ratio", Materials 13.17(2020):3883, Sep. 2, 2020, doi:10.3390/ma13173883.

Yubin Jun et al., "Early-age strength of CO2 cured alkali-activated blast furnace slag pastes", Construction and Building Materials 288 (2021) 123075, Mar. 26, 2021, https://doi.org/10.1016/j.conbuildmat.2021.123075.

* cited by examiner

AQUEOUS CARBONATION CURING METHOD OF BINDER COMPOSITION USING CARBON DIOXIDE ABSORBENT

CROSS-REFERENCE TO RELATED APPLICATION

This application claims priority to and the benefit of Korean Patent Application No. 10-2021-0060310 filed in the Korean Intellectual Property Office on May 10, 2021, and Korean Patent Application No. 10-2021-0060311 filed in the Korean Intellectual Property Office on May 10, 2021, the entire contents of which are incorporated herein by reference.

BACKGROUND OF THE INVENTION

(a) Field of the Invention

An exemplary embodiment of the present invention relates to an aqueous carbonation curing method of a binder composition using a carbon dioxide absorbent. More particularly, an exemplary embodiment of the present invention relates to a curing method of a binder composition which develops strength even with curing for a relatively short period of time.

(b) Description of the Related Art

Emission of greenhouse gas including carbon dioxide is one of the causes of global warming, and increases the frequency and range of worldwide natural disasters. Cement clinker production amount of Portland cement accounts for about 4% of global $CO_2$ emissions (2017 statistics), which is regarded as a serious problem in the construction industry.

It is known as one of the methods of lowering a $CO_2$ concentration in the atmosphere to use $CO_2$ for accelerating the curing of a cement-based material.

Calcium silicate such as alite and belite of Portland cement is spontaneously carbonated to mainly produce calcium carbonate ($CaCO_3$) and calcium silicate hydrate (C—S—H). Since during the $CO_2$ curing process, $CaCO_3$ and C—S—H is precipitated in pores of cast mortar and concrete, the strength of an early $CO_2$ cured cement-based material is rapidly increased. Densification of pores refines a microstructure including a cement paste matrix and an interfacial transition region to obtain higher strength within a shorter time.

In addition, a method of using replacement cement to replace cement to reduce $CO_2$ emissions is known. Calcium sulfoaluminate cement has a merit of allowing a firing process to be performed at low temperature. A firing temperature is lowered by about 100 to 200° C. as compared with the firing of Portland cement, which contributes to a decrease in $CO_2$ emissions. In addition, an alkali activated binder including a geopolymer synthesized from an industrial by-product such as blast furnace slag and fly ash is one of promising alternatives. Blast furnace slag also contains a large amount of calcium silicate. Hydration is vulnerable to carbonization potentially requiring an alkali activator. An alkali activator allows calcium to be dissolved from slag particles and calcium participates in formation of C—S—H gels contributing to development of strength.

The above information disclosed in this Background section is only for enhancement of understanding of the background of the invention, and therefore it may contain information that does not form the prior art that is already known in this country to a person of ordinary skill in the art.

SUMMARY OF THE INVENTION

An exemplary embodiment of the present invention provides a curing method of a binder composition.

More specifically, an exemplary embodiment of the present invention provides a curing method of a binder composition which develops strength even with curing for a relatively short time.

According to an embodiment of the present invention, an aqueous carbonation curing method of a binder composition includes: forming a binder composition; curing the binder composition in a negative pressure state (pre-curing step); water curing the pre-cured binder composition in an aqueous carbon dioxide absorbent solution (first curing step); and curing the first-cured binder composition in a 95% or more relative humidity atmosphere (second curing step).

The binder composition may include one or more of Portland cement, Class C fly ash, and ground granulated blast furnace slag; and one or more of water, liquid sodium silicate, an aqueous potassium hydroxide solution, and an aqueous sodium hydroxide solution.

30 to 60 parts by weight of one or more of water, the liquid sodium silicate, the aqueous potassium hydroxide solution, and the aqueous sodium hydroxide solution may be included, with respect to 100 parts by weight of one or more of the Portland cement, the Class C fly ash, and the ground granulated blast furnace slag.

The binder composition may include the Portland cement; the bottom ash fine aggregate; and water.

The binder composition may include 100 to 300 parts by weight of the bottom ash fine aggregate and 30 to 100 parts by weight of water, with respect to 100 parts by weight of the Portland cement.

The binder composition may include 100 to 500 parts by weight of silica and 10 to 50 parts by weight of the liquid sodium silicate, with respect to 100 parts by weight of one or more of the ground granulated blast furnace slag and the Class C fly ash.

A weight ratio of $SiO_2$ to $Na_2O$ in the liquid sodium silicate may be 2.0 to 3.5.

Before the pre-curing step, injecting the binder composition into a mold and performing molding (molding step) or compression-molding the binder composition to 0.5 MPa or more may be further included.

The molding step may be performed for 6 to 36 hours.

The pre-curing step may be performed at an atmospheric pressure of less than 0 kPa and −100 kPa or more.

The pre-curing step may be performed for 6 to 36 hours.

In the first curing step, the aqueous carbon dioxide absorbent solution may include one or more of an aqueous alkanolamine solution including monoethanolamine (MEA), diethanolamine (DEA), and triethanolamine (TEA), or an alkaline aqueous solution of one or more of KOH, NaOH, and $Na_2SiO_3$.

In the first curing step, a concentration of alkanolamine in the aqueous carbon dioxide absorbent solution may be 0.5 to 50 wt %.

In the first curing step, a concentration of an alkali activator in the aqueous carbon dioxide absorbent solution may be 1 to 5 M.

In the first curing step, the aqueous carbon dioxide absorbent solution may be obtained by dissolving carbon dioxide for 5 minutes to 3 hours.

In the first curing step, the aqueous carbon dioxide absorbent solution may have a pH of 8 to 14.

The second curing step may be performed at a temperature of 15 to 50° C. in a 95% or more relative humidity atmosphere.

DETAILED DESCRIPTION OF THE EMBODIMENTS

Figure 1:
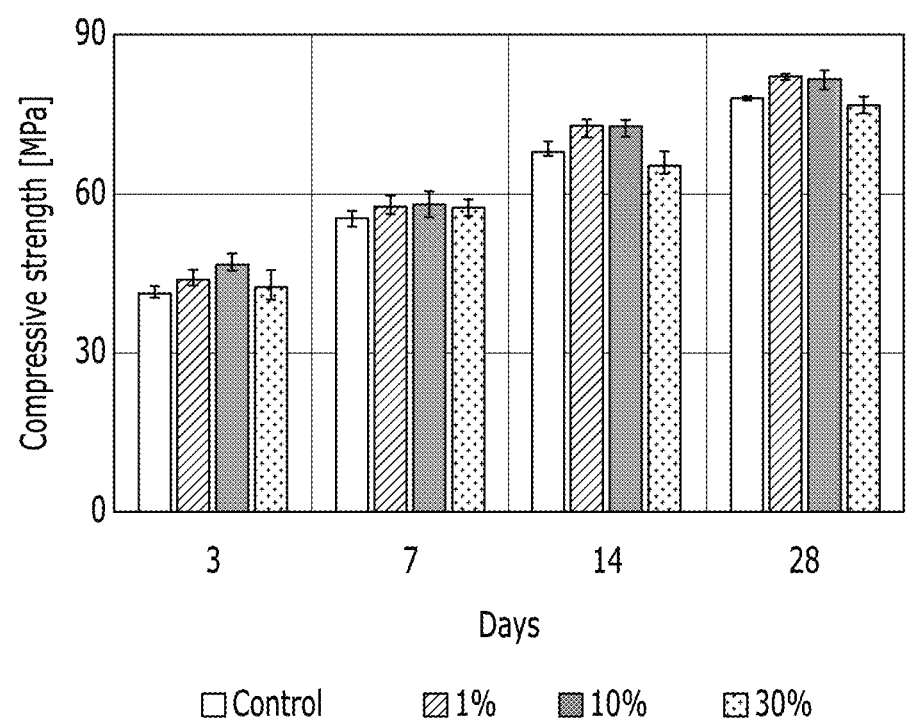
FIG. 1 is results of measuring compressive strength of cement paste cured in Example 1.

The terms such as first, second, and third are used for describing various parts, components, areas, layers, and/or sections, but are not limited thereto. These terms are used only for distinguishing one part, component, area, layer, or section from other parts, components, areas, layers, or sections. Therefore, a first part, component, area, layer, or section described below may be mentioned as a second part, component, area, layer, or section without departing from the scope of the present invention.

The terminology used herein is only for mentioning a certain example, and is not intended to limit the present invention. Singular forms used herein also includes plural forms unless otherwise stated clearly to the contrary. The meaning of "comprising" used in the specification is embodying certain characteristics, regions, integers, steps, operations, and/or components, and not excluding the presence or addition of other characteristics, regions, integers, steps, operations, and/or components.

Though not defined otherwise, all terms including technical terms and scientific terms used herein have the same meaning as commonly understood by a person with ordinary skill in the art to which the present invention pertains. Terms defined in commonly used dictionaries are further interpreted as having a meaning consistent with the related technical literatures and the currently disclosed description, and unless otherwise defined, they are not interpreted as having an ideal or very formal meaning.

Hereinafter, an exemplary embodiment of the present invention will be described in detail so that a person with ordinary skill in the art to which the present invention pertains may easily practice the invention. As those skilled in the art would realize, the described embodiments may be modified in various different ways, all without departing from the spirit or scope of the present invention.

The aqueous carbonation curing method of a binder composition according to an exemplary embodiment of the present invention includes: forming a binder composition; curing the binder composition in a negative pressure state (pre-curing step); water curing the pre-cured binder composition in an aqueous carbon dioxide absorbent solution (first curing step); and curing the first-cured binder composition in a 95% or more relative humidity atmosphere (second curing step).

Hereinafter, the curing method of a binder composition will be described in detail for each step.

A binder composition may include one or more of Portland cement, Class C fly ash, and ground granulated blast furnace slag; and one or more of water, liquid sodium silicate, an aqueous potassium hydroxide solution, and an aqueous sodium hydroxide solution.

In an exemplary embodiment of the present invention, when Portland cement and water are included, it is defined as cement paste. In the cement paste, 30 to 60 parts by weight of water may be included, with respect to 100 parts by weight of the cement. When water is too little, a problem with workability may arise. When water is too much, a problem of material separation may arise. More specifically, 40 to 50 parts by weight of water may be included with respect to 100 parts by weight of the cement. In an exemplary embodiment of the present invention, parts by weight refers to a relative weight ratio to the cement.

In an exemplary embodiment of the present invention, when Portland cement, water, and a fine aggregate are included, it is defined as cement mortar.

100 to 300 parts by weight of the fine aggregate and 30 to 100 parts by weight of water may be included in the cement mortar, with respect to 100 parts by weight of the cement. More specifically, as the fine aggregate, bottom ash having a high absorption rate may be used. When the bottom ash fine aggregate is too little, a problem of material separation may arise. When the bottom ash fine aggregate is too much, problems with workability and whether blending is possible may arise. When water is too little, a problem of material separation may arise. When water is too much, a problem with workability may arise. More specifically, 120 to 150 parts by weight of the bottom ash fine aggregate and 40 to 70 parts by weight of water may be included, with respect to 100 parts by weight of one or more of the cement and fly ash.

In an exemplary embodiment of the present invention, the binder composition may include one or more of ground granulated blast furnace slag, Class C fly ash; liquid sodium silicate, and silica.

More specifically, 100 to 500 parts by weight of silica may be included, with respect to 100 parts by weight of one or more of the ground granulated blast furnace slag and Class C fly ash. When the silica is too little, a problem in securing an air amount in the composition may arise. When the silica is too much, a problem in mixing the composition may arise due to the lack of the binder. More specifically, 250 to 350 parts by weight of the silica may be included, with respect to 100 parts by weight of the ground granulated blast furnace slag. In an exemplary embodiment of the present invention, "part by weight" refers to a relative weight ratio to the ground granulated blast furnace slag.

Sodium silicate ($Na_2SiO_3$) may be added in the form of a liquid. A weight ratio of $SiO_2$ to $Na_2O$ in the liquid sodium silicate may be 2.0 to 3.5. Only when sodium silicate added at an appropriate ratio is used, ground granulated blast furnace slag may be appropriately alkali-activated. More specifically, the ratio may be 2.5 to 3.3.

10 to 50 parts by weight of sodium silicate may be included, with respect to 100 parts by weight of one or more of the ground granulated blast furnace slag and the Class C fly ash. When sodium silicate is too little, a problem in which alkali activation is not appropriately performed may arise. When silica is too much, a problem of material separation in producing the composition may arise. More specifically, 35 to 50 parts by weight of sodium silicate may be included, with respect to 100 parts by weight of the ground granulated blast furnace slag. Since sodium silicate is a liquid, the weight of sodium silicate is defined as a weight including a solvent.

Before the pre-curing step, a step of injecting the binder composition into a mold and performing molding (molding step) may be further included.

In the molding step, by molding the binder composition, the size of a desired specimen may be determined. The molding step may be performed for 6 to 36 hours. When a molding time is too short, a problem in which it is difficult to maintain the shape during demolding may arise. When a molding time is too long, a hydration reaction proceeds to some extent to cause a problem in a degree of a carbonation reaction. The molding time refers to a time from injection of the binder composition into a mold to demolding. More specifically, the molding step may be 12 to 36 hours.

In addition, the prepared binder composition may be injected into a mold and compressed to be formed.

A forming pressure may be 0.5 MPa or more. When the forming pressure is too low, it is difficult to obtain an appropriate shape. When the forming pressure is too high, a void volume is small in a molded body, and thus, an alkali activator may not be evenly supplied in a water curing process described later. More specifically, the forming pressure may be 0.7 to 1.5 MPa.

Next, in the pre-curing step, the binder composition is cured in a negative pressure state. Moisture present in the binder composition is partly removed by the pre-curing step, so that the aqueous alkali activator solution may be evenly supplied in the water curing process described later. Here, the negative pressure refers to a pressure lower than the standard atmospheric pressure (101.33 kPa). More specifically, it means curing at an atmospheric pressure of less than 0 kPa and −100 kPa or more. More specifically, the curing may be performed at an atmospheric pressure of less than 0 kPa and −80 kPa or more. Here, 0 kPa refers to the standard atmospheric pressure (101.33 kPa).

The pre-curing step may be performed for 6 to 36 hours, When the pre-curing time is too short, the shape may not be appropriately maintained during demolding. When the pre-curing time is too long, a hydration reaction proceeds to some extent, so that a problem in a degree of future carbonation reaction may arise. More specifically, the pre-curing time may be 12 to 36 hours.

In the pre-curing step, the temperature may be 15 to 50° C. More specifically, the temperature may be 20 to 30° C. More specifically, the temperature may be 23 to 25° C.

A dried amount of a cement composition which has passed through the pre-curing step may be 1 to 10%. Here, a dried amount refers to ([water content in composition before drying]−[water content in composition after drying]/[water content in composition before drying]. More specifically, the dried amount may be 2 to 5%.

Next, in the first curing step, the pre-cured binder composition is water cured in an aqueous carbon dioxide absorbent solution. In the first curing step, the binder composition is water cured in the aqueous carbon dioxide absorbent solution, whereby carbon dioxide dissolved in an aqueous solution reacts with calcium and silica in the binder composition to form calcium carbonate and calcium silicate hydrate, and thus, carbon dioxide absorption and initial strength may be improved.

Here, the aqueous carbon dioxide absorbent solution may include one or more of an aqueous alkanolamine solution such as monoethanolamine (MEA), diethanolamine (DEA), and triethanolamine (TEA) and an alkaline aqueous solution such as KOH, NaOH, and $Na_2SiO_3$.

The aqueous carbon dioxide absorbent solution may include 0.5 to 50 wt % of the alkanolamine. When the alkanolamine is included too little, the effect of improving strength may not be appropriately shown. When the alkali activator is included too much, an appropriate hydration reaction of the binder composition does not proceed due to the lack of a water content in the aqueous solution to cause a problem in strength development. More specifically, 5 to 35 wt % of the alkali activator may be included. More specifically, 20 to 35 wt % of the alkali activator may be included. Carbon dioxide may be dissolved therein. Carbon dioxide may further improve strength by a carbonation reaction. In addition, the binder composition may absorb a part of carbon dioxide to be used for removing carbon dioxide which is the main cause of the greenhouse effect.

That is, carbon dioxide may be dissolved at 50% (0.5 mol $CO_2$/MEA) relative to the number of moles of alkanolamine in the aqueous carbon dioxide absorbentsolution.

In addition, the aqueous carbon dioxide absorbent solution may have an alkaline aqueous solution concentration of 1 to 5 M. When the concentration of the alkali activator is too low, the role of the alkali activator described above may not be appropriately performed, and strength is not appropriately improved. When the concentration of the alkali activator is too high, a safety problem in the work may arise. More specifically, the concentration of the aqueous carbon dioxide absorbent solution may be 1 to 1.5 M.

The aqueous carbon dioxide absorbent solution may include carbon dioxide. Carbon dioxide may be present in the aqueous solution in the state of being dissolved. The aqueous carbon dioxide absorbent solution may be obtained by dissolving carbon dioxide for 5 minutes to 1 hour. Carbon dioxide is dissolved, thereby further improving strength by a carbonation reaction and contributing to reduction of greenhouse gases. However, when carbon dioxide is included too much, the pH of the aqueous alkali activator solution is decreased to reduce the reaction of calcium ions in the slag, so that strength may be rather decreased.

By performing the treatment as described above, 1 mol of carbon dioxide may be dissolved relative to 1 mol of an alkali ion in the alkaline aqueous solution. More specifically, the aqueous alkali activator solution may be obtained by dissolving carbon dioxide for 5 minutes to 25 minutes. More specifically, it may be obtained by dissolving carbon dioxide for 15 minutes to 25 minutes.

The alkaline aqueous solution which includes the appropriate alkaline aqueous solution and carbon dioxide as such may have a pH of 8 to 14. When the pH is too low, it corresponds to the case in which the alkali activator is not appropriately included, or carbon dioxide is included too much, and appropriate strength may not be obtained. When the pH is too high, it corresponds to the case in which the alkali activator is included too much, or carbon dioxide is included too little, and appropriate strength may not be obtained. More specifically, the pH may be 10 to 14.0. More specifically, the pH may be 12 to 13.5.

In the first curing step, the temperature may be 15 to 50° C. More specifically, the temperature may be 20 to 30° C. More specifically, the temperature may be 23 to 25° C.

The first curing step may be performed for 1 to 5 days. By curing during the time described above, the alkali activator may be evenly supplied. More specifically, the curing step may be performed for 2 days to 3 days.

Next, in the second curing step, the first-cured binder composition is cured at a relative humidity of 95% or more. By first curing in a high-humidity atmosphere before the second curing in the carbon dioxide atmosphere, a specimen may be demoded from a mold in a short time. When a humidity in the first curing step is too low, demolding in a short time may be difficult, and also, dry shrinkage may occur. More specifically, a relative humidity in the second curing step may be 80 to 85%.

In the second curing step, the temperature may be 15 to 50° C. More specifically, the temperature may be 20 to 30° C. More specifically, the temperature may be 23 to 25° C.

The second curing step may be performed for 3 days to 28 days.

Hereinafter, the present invention will be described in detail by the examples. However, the examples are only for illustrating the present invention, and the present invention is not limited thereto.

Example 1

100 parts by weight of cement and 40 parts by weight of water were mixed to prepare a cement paste. In addition, 100 parts by weight of cement, 50 parts by weight of water, and 120 parts by weight of a bottom ash fine aggregate were mixed to prepare a cement mortar. The cement paste and the cement mortar were mixed for 5 minutes with a planetary mixer, and the cement paste sample was formed in a mold having a 25 mm square size and the cement mortar sample was formed in a mold having a 40 mm square size. After 24 hours, the samples were demolded, and dried under the conditions of −50 kPa for 24 hours. The dried amount of the samples was about 3.7%. Thereafter, the dried samples were water cured in an aqueous monoethanolamine solution. Here, the aqueous monoethanolamine solution was prepared by mixing 1 wt %, 10 wt % and 30 wt % of monoethanolamine and water. Then, in the prepared aqueous monoethanolamine solution, carbon dioxide was completely dissolved at 50% (0.5 mol $CO_2$/MEA) relative to the number of amine moles.

The sample cured in a 1 wt % aqueous monoethanolamine solution was named as Example 1-1, the sample cured in a 10 wt % solution was named as Example 1-2, and the sample cured in a 30 wt % solution was named as Example 1-3. In addition, Comparative Example (Control) 1 which was water cured in general water without monoethanolamine was prepared for comparison.

The compressive strength of each sample was measured on days 3, 7, 13, and 28 after mixing. The compressive strength of four samples was measured, respectively and the average value thereof was calculated according to the standard test method specified ASTM C109. The measured compressive strength is summarized in FIG. 1 for the cement paste sample, and in FIG. 2 for the cement mortar sample.

In the results of the cement paste, when water curing was performed in the 1 wt % aqueous monoethanolamine solution in which carbon dioxide was completely dissolved, a strength development degree was the highest as compared with Comparative Example 1. However, in the 30 wt % aqueous monoethanolamine solution, the strength was not developed.

Figure 2:
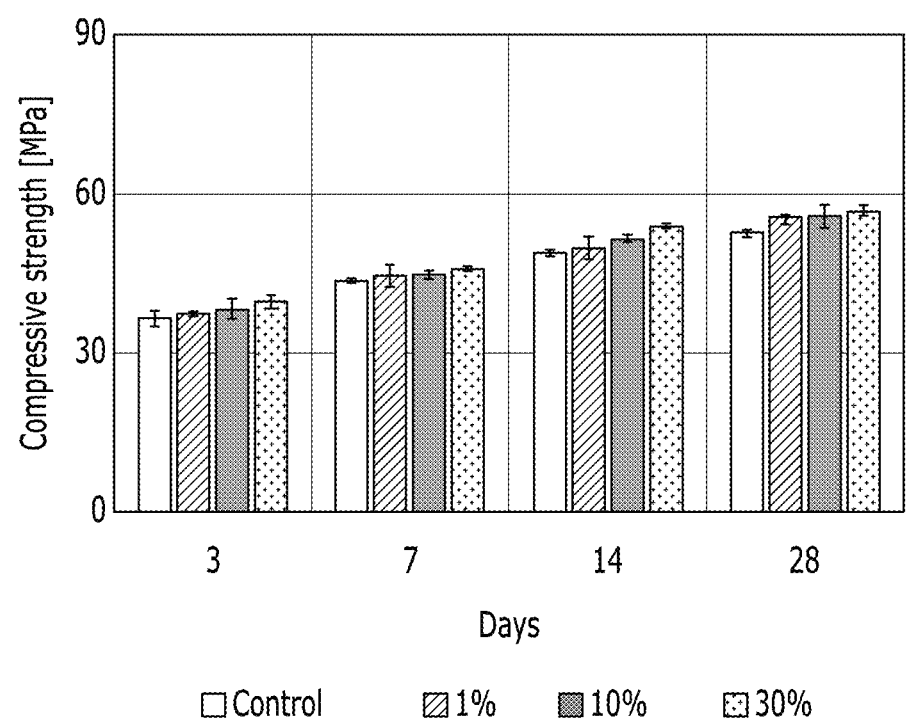
FIG. 2 is results of measuring compressive strength of cement mortar cured in Example 1.

In the results of mortar in FIG. 2, unlike the results of the cement paste, when water curing was performed in the 30 wt % aqueous monoethanolamine solution in which carbon dioxide was completely dissolved, a strength development degree was high. This shows that when curing was performed in monoethanolamine in which carbon dioxide was dissolved, the strength was somewhat high as compared with the case of water curing in general water.

Example 2

Preparation was performed by mixing ground granulated blast furnace slag and silica No. 4 (average particle size of 1.2 to 1.5 mm) with liquid sodium silicate.

As the sodium silicate used herein, a product having a $SiO_2/Na_2O$ weight ratio of 3.0 was used. Each was mixed with water at a volume ratio of 1:1. When the ground granulated blast furnace slag of Slag 1 was used, 35 parts by weight of the aqueous sodium silicate solution was mixed with respect to 100 parts by weight of the slag, and when the ground granulated blast furnace slag of Slag 2 was used, 50 parts by weight of the aqueous sodium silicate was mixed with respect to 100 parts by weight of the slag. Further, 300 parts by weight of silica was mixed with respect to 100 parts by weight of the ground granulated blast furnace slag. Mixing was performed for about 5 minutes with a planetary mixer, and then compression forming was performed with a force of 1 MPa in a mold having a 40 mm square size to fabricate a formed body. At this time, the compression forming was performed by uniformly measuring the sample weight so that the void volume to the entire volume of the fabricated specimen was 17 vol %. After manufacturing the samples, the samples were dried under the conditions of −50 kPa for 6 hours. Thereafter, the dried samples were water cured in an aqueous potassium hydroxide solution having a 1 M molar concentration. At this time, the aqueous potassium hydroxide solution having a 1 M molar concentration was classified into five types depending on the dissolved amount of carbon dioxide, and the samples were cured in each case. The aqueous potassium hydroxide solution having a 1 M molar concentration in which carbon dioxide was not dissolved at all had a pH value of about 14 and was named as Example 2-1. Then, the aqueous potassium hydroxide solution having a 1 M molar concentration in which carbon dioxide was dissolved for 10 minutes had a pH value between 13 and 14, and was named as Example 2-2. In addition, the aqueous potassium hydroxide solution in which carbon dioxide was dissolved for 20 minutes had a pH value between 12 and 13, and was named as Example 2-3. The aqueous solution in which carbon dioxide was dissolved for 30 minutes had a pH value between 11 and 12, and was named as Example 2-4.

TABLE 1

| Label | Time of $CO_2$ bubbling in 1 M KOH aqueous solution (h) | pH |
|---|---|---|
| CO2-0 | 0 | >14 |
| CO2-0.2 h | 0.2 | 13-14 |
| CO2-0.5 h | 0.5 | 12-13 |
| CO2-1.0 h | 1.0 | 11-12 |
| CO2-3.0 h | 3.0 | 9-10 |

In the aqueous potassium hydroxide solution having a 1 M molar concentration, the sample was water cured for 66 hours (3 days old after fabricating the sample). After the water curing, further curing was performed until day 28 in the atmosphere at 25° C. at the relative humidity of 95%.

In addition, after drying the sample in a dry air state, Comparative Example (control) 2 which was cured in the air at 25° C. at the relative humidity of 95% was prepared for comparison.

The compressive strength of each sample was measured on days 3, 7, and 28 after mixing. The compressive strength of four samples was measured, respectively, and the average value was calculated. The measured compressive strength is summarized in FIG. 3 for the sample using Slag 1, and in FIG. 4 for the sample using Slag 2.

Figure 3:
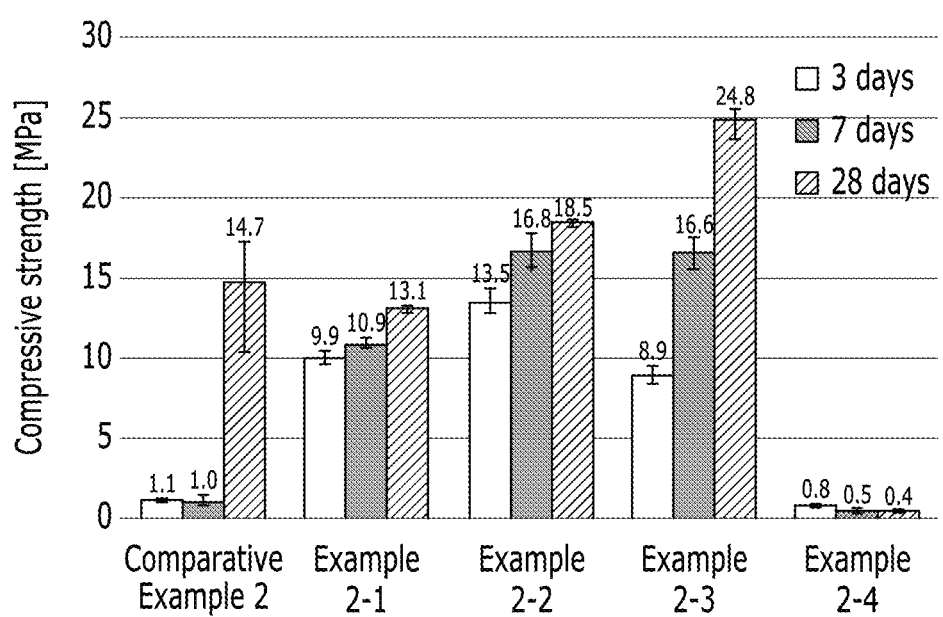
FIG. 3 is results of measuring compressive strength of alkali activated slag mortar using Slag 1 in Example 2.
Figure 4:
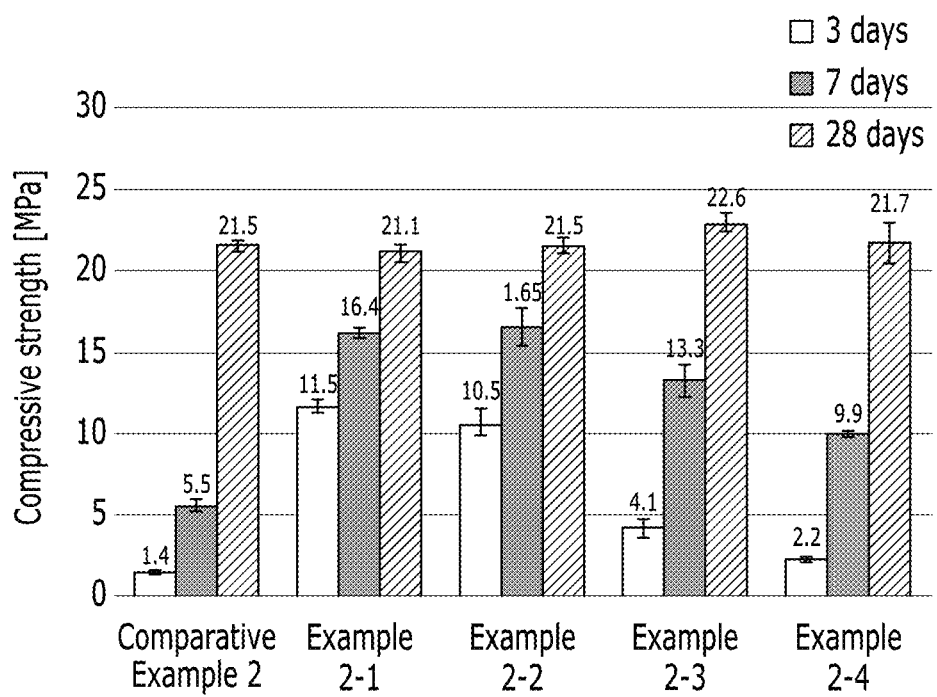
FIG. 4 is results of measuring compressive strength of alkali activated slag mortar using Slag 2 in Example 2.

As shown in FIGS. 3 and 4, at 3 days old, though the Comparative Example 1 did not develop strength, strength was developed in the aqueous potassium hydroxide solution having a 1 M molar concentration and the 1 M aqueous potassium hydroxide solution in which carbon dioxide was dissolved. However, in Example 2-4 in which carbon dioxide was dissolved in a relatively large amount, the sample including Slag 1 did not developed strength. This shows that by initially water curing the sample by the alkali activator, strength development occurred by sufficient alkali activator supplementation. In addition, in FIG. 3, the strength development of the sample which was water cured in the aqueous potassium hydroxide solution of Example 2-2 in which carbon dioxide was appropriately dissolved was the best. This shows that the strength development of the sample was further promoted by the carbonation reaction. At 7 days old, the comparative example did not still develop strength. On the contrary, the strength development of the samples which were further cured in the air at 25° C. at the relative humidity of 95% after being water cured in the aqueous potassium hydroxide solution was excellent. In particular, in FIGS. 3 and 4, the strength development was excellent in the sample of Example 2 in which carbon dioxide was appropriately dissolved, regardless of the type of slag. However, Example 2-4 using Slag 1 still did not show strength development. In the final strength on day 28, the sample of the comparative example developed strength. In the samples using Slag 1 (FIG. 3), the strength of the sample of the comparative example was much increased as compared with the samples which were water cured in the aqueous potassium hydroxide solution having a 1 M molar concentration, and the strength of the samples using Slag 2 (FIG. 4) was similar. However, among the samples using Slag 1 and Slag 2, the strength development of Example 2-3 was best.

At initial 3 days old, the initial strength development of the samples which were water cured in the aqueous alkali activator solution was excellent as compared with the comparative example. After 28 days, the sample of Comparative Example 2 developed strength at a similar level to the samples which were water cured in the aqueous alkali activator solution, but the sample of Example 2-3 showed better strength development. It is recognized therefrom that it is better for final strength development to perform water curing with an aqueous solution having a pH of 12 adjusted by dissolving carbon dioxide in the aqueous alkali activator solution.

Figure 5:
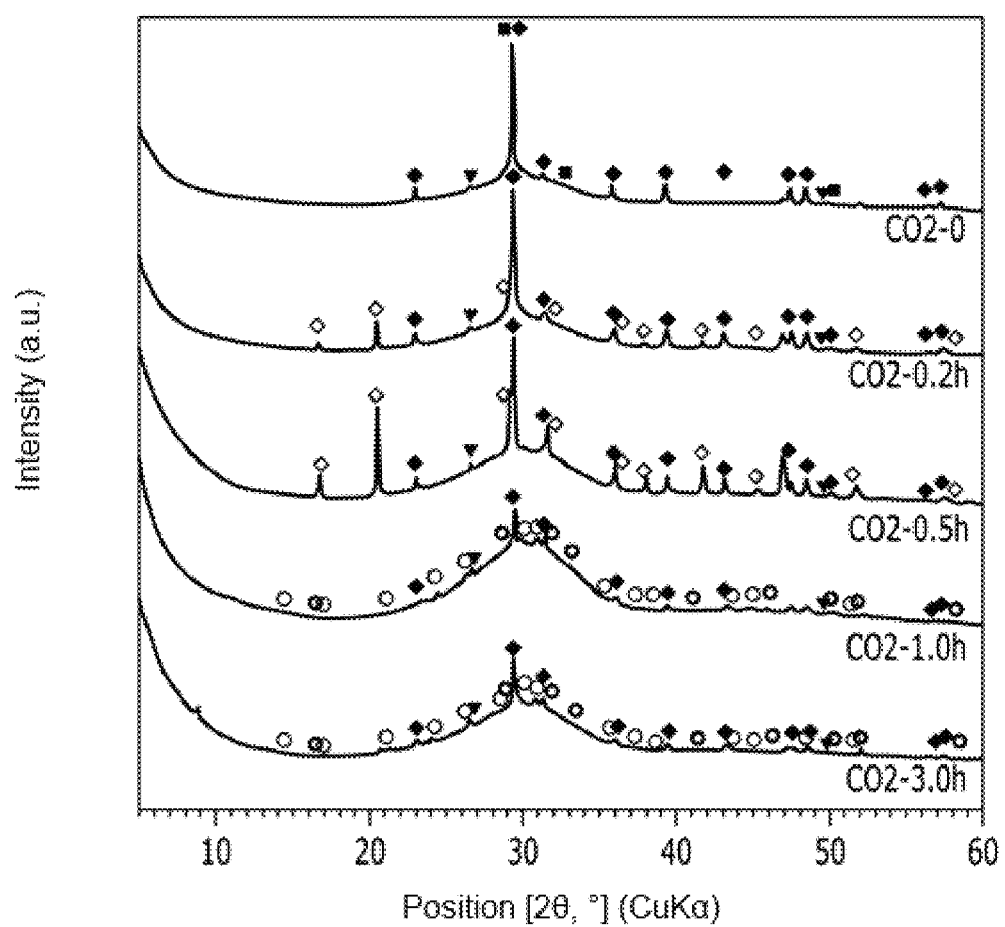
FIG. 5 is an XRD pattern graph of alkali activated slag mortar using Slag 1 in Example 2.
Figure 6:
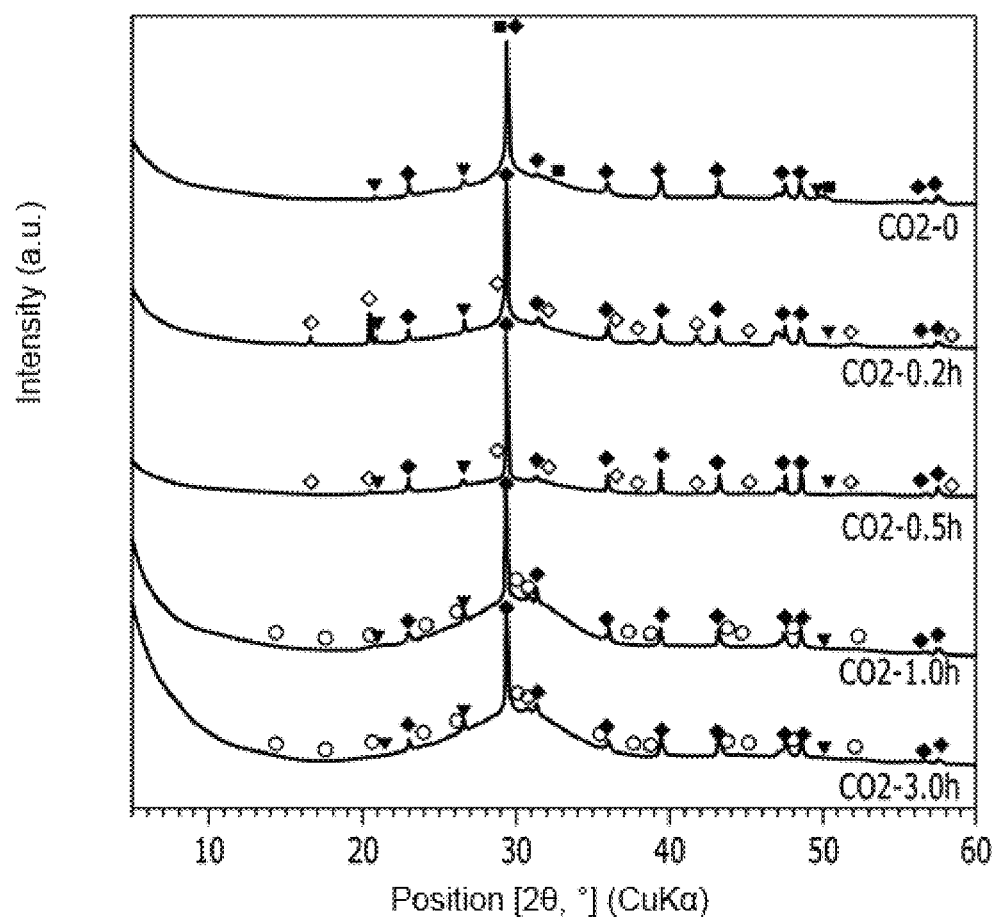
FIG. 6 is an XRD pattern graph of alkali activated slag mortar using Slag 2 in Example 2.

FIGS. 5 and 6 shows the XRD patterns of the paste samples, corresponding to the mortar samples, at 3 days. The samples overall included calcium silicate hydrates (C—S—H), the representative product of alkali-activated slag (Puertas et al., 2004), calcite and quartz where it originated from the raw GGBFS used. The samples cured in CO2-0.2 h or CO2-0.5 h conditions included monohydrocalcite, the hydrous form of calcite (CaCO3·H2O). However, the samples cured in CO2-1.0 h and CO2-3.0 h showed an abundant amorphous phase (with a hump from roughly 25° to 35°) in their XRD pattern.)

■ C—S—H (ICDD file no. 33-0306); ▼ Quartz (ICDD file no. 78-1252);

◆ Calcite (ICDD file no. 81-2027); ◇ Monohydrocalcite (ICDD file no. 22-0147);

○ Potassium sulfate (ICDD file no. 83-0681); ⊚ Akermanite (ICDD file no. 79-2424)

The present invention is not limited to the exemplary embodiments, but may be produced in various forms different from each other. A person with ordinary skill in the art to which the present invention pertains will understand that the present invention may be carried out in other specific forms without changing the technical idea or the essential feature of the present invention. Therefore, the exemplary embodiments described above should be understood to be illustrative in all respects, and not to be restrictive.

What is claimed is:

1. A curing method of a binder composition, the method comprising:
   forming a binder composition;
   curing the binder composition in a negative pressure state (pre-curing step);
   water curing the pre-cured binder composition in an aqueous carbon dioxide absorbent solution (first curing step); and
   curing the first-cured binder composition in a 95% or more relative humidity atmosphere (second curing step),
   wherein in first curing step, the aqueous carbon dioxide absorbent solution is dissolved with carbon dioxide for 5 minutes to 1 hour, and
   wherein in the first curing, the aqueous carbon dioxide absorbent solution includes an alkali activator including one or more of an aqueous alkanolamine solution including one or more of monoethanolamine (MEA), diethanolamine (DEA), and triethanolamine (TEA), or an alkaline aqueous solution including one or more of KOH and $Na_2SiO_3$.

2. The curing method of a binder composition of claim 1, wherein:
   the binder composition includes one or more of Portland cement, Class C fly ash, and ground granulated blast furnace slag; and one or more of water, liquid sodium silicate, an aqueous potassium hydroxide solution, and an aqueous sodium hydroxide solution.

3. The curing method of a binder composition of claim 2, wherein:
   the binder composition includes 30 to 60 parts by weight of one of water, the liquid sodium silicate, the aqueous potassium hydroxide solution, and the aqueous sodium hydroxide solution, with respect to 100 parts by weight of one or more of the Portland cement, the Class C fly ash, and the ground granulated blast furnace slag.

4. The curing method of a binder composition of claim 1, wherein:
   the binder composition includes the Portland cement; a bottom ash fine aggregate; and water.

5. The curing method of a binder composition of claim 4, wherein:
   the binder composition includes 100 to 300 parts by weight of the bottom ash fine aggregate and 30 to 100 parts by weight of water, with respect to 100 parts by weight of the Portland cement.

6. The curing method of a binder composition of claim 1, wherein:
   the binder composition includes 100 to 500 parts by weight of silica and 10 to 50 parts by weight of the liquid sodium silicate, with respect to 100 parts by weight of one or more of the ground granulated blast furnace slag and the Class C fly ash.

7. The curing method of a binder composition of claim 6, wherein:
   a weight ratio of $SiO_2$ to $Na_2O$ in the liquid sodium silicate is 2.0 to 3.5.

8. The curing method of a binder composition of claim 1, further comprising:
   before the pre-curing, injecting the binder composition into a mold and performing molding (molding step).

9. The curing method of a binder composition of claim 1, wherein:
   in the forming, the binder composition is compressed to 0.5 MPa or more.

10. The curing method of a binder composition of claim 1, wherein:
    the pre-curing is performed at an atmospheric pressure of less than 0 kPa and −100 kPa or more.

11. The curing method of a binder composition of claim 1, wherein:
    0.5 to 50 wt % of the alkanolamine is included in the aqueous carbon dioxide absorbent solution.

12. The curing method of a binder composition of claim 1, wherein:
    the aqueous carbon dioxide absorbent solution includes a primary alkanolamine.

13. The curing method of a binder composition of claim 1, wherein:
    in the first curing, a concentration of the alkali activator in the aqueous carbon dioxide absorbent solution is 1 to 5 M.

14. The curing method of a binder composition of claim 1, wherein:
    the pre-curing, the first curing, and the second curing are performed at a temperature of 15 to 50° C., respectively.

* * * * *